United States Patent [19]

Kiese et al.

[11] Patent Number: 4,582,607

[45] Date of Patent: Apr. 15, 1986

[54] PROCESS FOR THE BIOLOGICAL TREATMENT OF WASTE WATER

[75] Inventors: Siegfried Kiese, Dortmund; Ulrich Scheffler, Essen, both of Fed. Rep. of Germany

[73] Assignee: Fried. Krupp Gesellschaft mit beschränkter Haftung, Essen, Fed. Rep. of Germany

[21] Appl. No.: 706,946

[22] Filed: Mar. 1, 1985

[30] Foreign Application Priority Data

Apr. 4, 1984 [DE] Fed. Rep. of Germany ..... 34125531

[51] Int. Cl.$^4$ .............................................. C02F 3/02
[52] U.S. Cl. ................................... 210/612; 210/616; 210/625; 210/627
[58] Field of Search ............... 210/612, 180, 178, 625, 210/626, 627, 177, 218, 604, 613, 624, 195.3, 614, 616

[56] References Cited

U.S. PATENT DOCUMENTS

| | | | |
|---|---|---|---|
| 2,190,598 | 2/1940 | Fischer | 210/612 |
| 3,337,448 | 8/1967 | Rich | 210/612 |
| 3,926,794 | 12/1975 | Vahldieck | 210/612 |
| 3,977,966 | 8/1976 | Pradt et al. | 210/625 |
| 4,246,009 | 1/1981 | Gould et al. | 210/627 |
| 4,276,174 | 6/1981 | Breider et al. | 210/613 |
| 4,340,484 | 7/1982 | Pollock et al. | 210/627 |

FOREIGN PATENT DOCUMENTS 2438589 3/1975 Fed. Rep. of Germany .
3240009 5/1984 Fed. Rep. of Germany ...... 210/612

OTHER PUBLICATIONS

Scheffler et al., *Tech. Mitt. Krupp Forsch.-Ber.* [Technical Reports from Krupp Research], vol. 40, No. 1, 1982, pp. 13-18.
G. Renz, *Wasser, Luft and Betrieb* [Water, Air and Operation], vol. 22, No. 10, 1978, pp. 535-539.
Eisenacher et al., *Umwelt und Technik* [Environment and Engineering], 81, pp. 6-10.

*Primary Examiner*—Benoit Castel
*Attorney, Agent, or Firm*—Spencer & Frank

[57] ABSTRACT

A method is disclosed for the biological aerobic purification of waste waters wherein a temperature from 30° to 60° C. is maintained in a first process stage and a temperature from 20° to 40° C. is maintained in a second process stage, with the temperature in the first process stage always being higher than the temperature in the second process stage and wherein a part of the activated sludge of the second process stage, after being seperated, is returned to the first process stage. The process provides a high decomposition output and produces an activated sludge which exhibits good sedimentation behavior.

7 Claims, 1 Drawing Figure

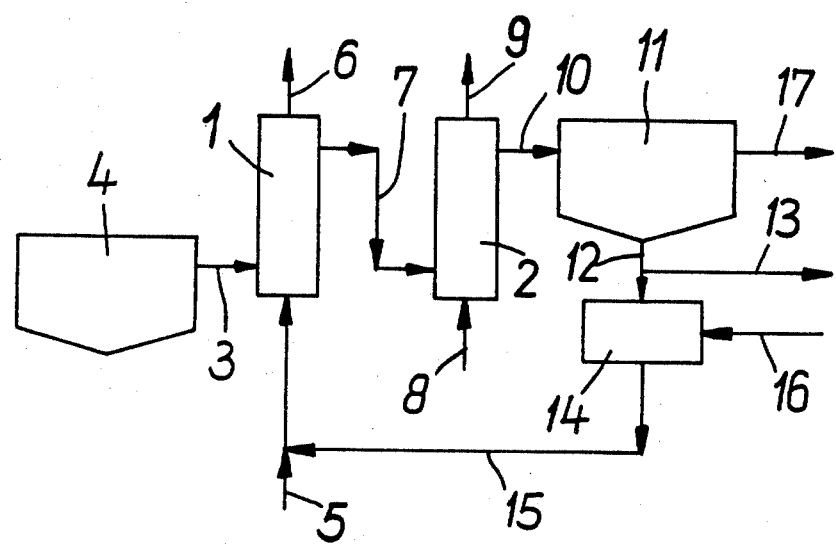

PROCESS FOR THE BIOLOGICAL TREATMENT OF WASTE WATER

BACKGROUND OF THE INVENTION

The present invention relates to a process for the aerobic biological treatment of waste water with partial recirculation of the activated sludge, and to a device for implementing the process. In the biological treatment of waste water, the organic contaminants dissolved in the water or present in colloidal form are oxidatively decomposed by microorganisms through their metabolic activity, with oxygen from the air being introduced into the waste water as an oxidation agent and to support cellular respiration. The products of aerobic biological waste water purification are carbon dioxide and water, as well as activated sludge composed of both dead and viable microorganisms and nondecomposed and mineralized waste water components.

It is the general custom to operate aerobic biological waste water purification processes at ambient temperatures. Since the speed of biochemical reactions increases with increasing temperature, many experiments have been conducted to effect waste water purification at temperatures above 45° C. using thermophilic microorganisms. However, high temperature aerobic treatment can only be used in industry in special cases (e.g., stabilization of liquid manure) because thermophilic aerobic microorganisms produce a very finely dispersed activated sludge, which has very poor sedimentation characteristics and is thus very expensive to remove from the waste water. Moreover, the finely dispersed structure of thermophilic activated sludge prevents the formation of a high biomass concentration so that the oxidation output (volume efficiency) of the system is reduced. In addition, the finely dispersed character of thermophilic bacteria does not permit the efficient recirculation of part of the activated sludge, which is the general custom in the waste water purification art, in order to achieve a uniformly high biomass concentration and thus assure optimum decomposition of the waste at certain temperatures.

SUMMARY OF THE INVENTION

It is the object of the present invention to provide an aerobic biological waste water purification process which utilizes the increased decomposition rate characteristic of thermophilic microorganisms while simultaneously producing an activated sludge capable of efficient sedimentation and which forms a high biomass concentration.

This object is accomplished in a two stage high temperature activated sludge process wherein a temperature of from 30° to 60° C. is maintained in the first process stage and a temperature of from 20° to 40° C. is maintained in the second process stage, with the temperature in the first process stage always being higher than the temperature in the second process stage, and wherein part of the activated sludge from the second process stage is returned to the first process stage after concentration. Surprisingly, we have found that the alternating changes in temperature do not result in loss of activity in the activated sludge circulating between the warmer and colder process stages. In fact, the recirculation from the colder to the warmer stage has demonstrated very positive effects with respect to important process parameters such as activated sludge activity, contaminant removal rates, excess sludge formation, and sedimentation characteristics of the activated sludge. Thus, the process according to the present invention utilizes the high contaminant removal rates and the reduced rate of excess sludge formation existing in the thermophilic range without there occurring reduced separability of the finely dispersed activated sludge typical for thermophilic bacteria. Moreover, the process parameters according to the present invention make it possible to operate without the input of thermal energy.

BRIEF DESCRIPTION OF THE DRAWING

The drawing is a process flow diagram illustrating the two stage aerobic digestion process of the invention with settleable solids removal pretreatment and with a portion of the concentrated solids separated from the second stage discharge stream being pre-aerated and recycled to the first aerobic digestion stage.

DETAILED DESCRIPTION OF THE INVENTION

The process according to the present invention can be implemented to particular advantage if a temperature difference of 5° to 40° C., preferably 15° to 25° C., is maintained between the first process stage and the second process stage. This temperature difference results in the production of a particularly settleable activated sludge which can be easily separated from the discharge of the second process stage.

It is further provided that the activated sludge returned to the first stage may be reactivated by mixing with air, oxygen or hydrogen peroxide. With this measure, the decomposition activity (oxidative degradation rate) of the returned activated sludge is increased.

In another embodiment of the present invention, the first process stage or both process stages may be operated with oxygen or oxygen enriched air. In addition to providing sufficient oxygen for aerobic degradation, this measure improves the thermal balance of the first process stage as the quantity of gas flowing through the stage is reduced and less heat is thus dissipated. The heat generated in the first process stage during the oxidation reaction is thus utilized to maintain an optimally high reaction temperature.

In a further embodiment of the present invention, activated carbon in a quantity of from 5 to 500 g/l, preferably 10 to 30 g/l, may be added to the waste water, with the result that the sedimentation rate of the activated sludge is improved. In addition, the activated carbon may aid in removing contaminants which are resistant to biodegradation or which degrade over periods of time larger than the residence time in the biological treatment stages, as well as increase the reaction rate of direct oxidation reactions.

The objects of the invention are further achieved using a particular apparatus for implementing the process, the apparatus comprising two series connected closed loop reactors having a taper (height-to-diameter ratio) of greater than 5, and a separator following the second reactor for removing and concentrating the activated sludge. The loop reactors designed according to the present invention permit good oxygen uptake and high oxygen yield (oxygen utilization). Moreover, they can be provided with heat insulation so that the process temperature can be maintained quite accurately. The separator may be any solids separator, such as a sedimentation basin, decanter or centrifuge, which permits the separation of the activated sludge so that purified and clean (solids free) waste water is discharged.

A further feature of the present invention provides that each loop reactor is composed of a plurality of series connected reactors, thus avoiding too high a structure and optimizing oxygen uptake. It is intended to utilize the process of the present invention for purifying highly contaminated industrial waste waters.

The present invention will now be explained in greater detail with the aid of a process flow diagram illustrated in the drawing.

The waste water to be purified is collected and larger solid particles are removed in primary sedimentation basin 4. The waste water then travels through conduit 3 into loop reactor 1, to which oxygen enriched air is supplied through conduit 5. The exhaust air leaves loop reactor 1 through conduit 6. The partially purified waste water mixed with sludge leaves loop reactor 1 through conduit 7 and enters loop reactor 2, to which air is added through conduit 8. The exhaust air leaves loop reactor 2 through conduit 9. The mixture of purified waste water and activated sludge leaves loop reactor 2 through conduit 10 and enter separator 11, where the activated sludge is removed. The activated sludge flows out of separator 11 through conduit 12. A partial stream of activated sludge is discharged through conduit 13 to the sludge treatment system. The remaining activated sludge enters vessel 14, where it is aerated, and then recycled from there through conduit 5 to loop reactor 1. Aeration vessel 14 is supplied with air through conduit 16. The clarified and purified waste water leaves separator 11 through conduit 17 and travels from there into the treated wastewater discharge channel.

EXAMPLE 1

The waste water from a baking yeast factory (COD = 20,000 mg $O_2$/l; $BOD_5$ = 16,000 mg $O_2$/l) was purified in the process according to the invention in an experimental system, in which a temperature of 55° C. was maintained in the first process stage and a temperature of 40° C. in the second process stage. For comparison, the same waste water was aerobically biologically purified at a temperature of 50° C. in a single-stage process. The following results were obtained.

A. In the single-stage process, a space charge of $B_R$ = 13.5 kg COD/m³/d and a sludge charge of $B_{TS}$ = 0.8 kg COD/kg TS/d produced a decomposition output of $\Delta B_R$ = 10.5 kg COD/m³/d, corresponding to a sludge decomposition output of $\Delta B_{TS}$ = 0.6 kg COD/kg TS/d. The total solids concentration in the clarified discharge of the separator designed as concentrator was 1.7 kg TS/m³ for a clarification surface charge of 1.8 kg TS/m²/h.

B. In the two-stage process according to the present invention, for a space charge of $B_R$ = 18 kg COD/m³/d and for a sludge charge of $B_{TS}$ = 2.1 kg COD/kg TS/d, the decomposition output was $\Delta B_R$ = 14.2 kg COD/m³/d and the sludge decomposition output was $\Delta B_{TS}$ = 1.7 kg COD/kg TS/d. The charge figures are here taken with respect to the total system. In spite of a clarification surface charge of 3.0 kg TS/m³/h, which is higher than that used in the single-stage process, the total solids content in the discharge of the separator designed as a sludge concentrator dropped to 0.7 kg TS/m³. The process according to the present invention resulted in a $BOD_5$ reduction of more than 90%.

It was also found that the quantity of newly formed activated sludge, at a sludge age of five days, was 0.37 kg TS/kg decomposed COD in the single-stage process, and only 0.22 kg TS/kg decomposed COD in the process according to the present invention.

COD = chemical oxygen demand
TS = dry substance of the activated sludge (total solids)
taper = height of loop reactor divided by diameter of loop reactor
$BOD_5$ = five-day biochemical oxygen demand It will be understood that the above description of the present invention is susceptible to various modifications, changes and adaptations, all of which are intended to be comprehended within the meaning and range of equivalents of the appended claims.

What is claimed is:

1. An activated sludge biological treatment process for the aerobic purification of waste water wherein the activated sludge is at least partially recirculated, comprising: aerobically degrading contaminants in waste water by mixing the waste water with activated sludge in a first process stage in which a temperature from 30° to 60° C. is maintained and aerating said mixture; passing said mixture to a second process stage in which a temperature from 20° to 40° C. is maintained and further aerating said mixture; passing said further aerated mixture to a separator means wherein the activated sludge is removed from the waste water by differences in gravity; and recycling at least part of the activated sludge to the first process stage; wherein the temperature in the first process stage is always higher than the temperature in the second process stage, and a temperature difference of 5° to 40° C. is maintained between the first process stage and the second process stage.

2. The process of claim 1, wherein a temperature difference of 15° to 20° is maintained between the first process stage and the second process stage.

3. The process of claim 1, wherein the activated sludge recycled to the first process stage is reactivated by mixing with at least one oxygenating medium selected from the group consisting of air, oxygen and hydrogen peroxide before entering the first process stage.

4. The process of claim 1, wherein one or both process stages are aerated with oxygen or with oxygen enriched air.

5. The process of claim 1, wherein activated carbon in a quantity of from 5 g/l to 100 g/l is mixed with the waste water.

6. The process of claim 6, wherein activated carbon in a quantity of from 10 g/l to 30 g/l is mixed with the waste water.

7. The process of claim 1 wherein all of the activated sludge leaving the first process stage passes to the second process stage.

* * * * *